Aug. 28, 1928.

R. REID ET AL 1,682,418

CUTTING MACHINE

Filed Aug. 31, 1927

4 Sheets-Sheet 1

Inventors
Robert Reid
Andrew S. Reid
by J. Stanley Churchill
atty.

Aug. 28, 1928.

R. REID ET AL 1,682,418

CUTTING MACHINE

Filed Aug. 31, 1927   4 Sheets-Sheet 2

Inventors
Robert Reid
Andrew S. Reid
by J. Stanley Churchill
atty.

Aug. 28, 1928.
R. REID ET AL
1,682,418
CUTTING MACHINE
Filed Aug. 31, 1927
4 Sheets-Sheet 3
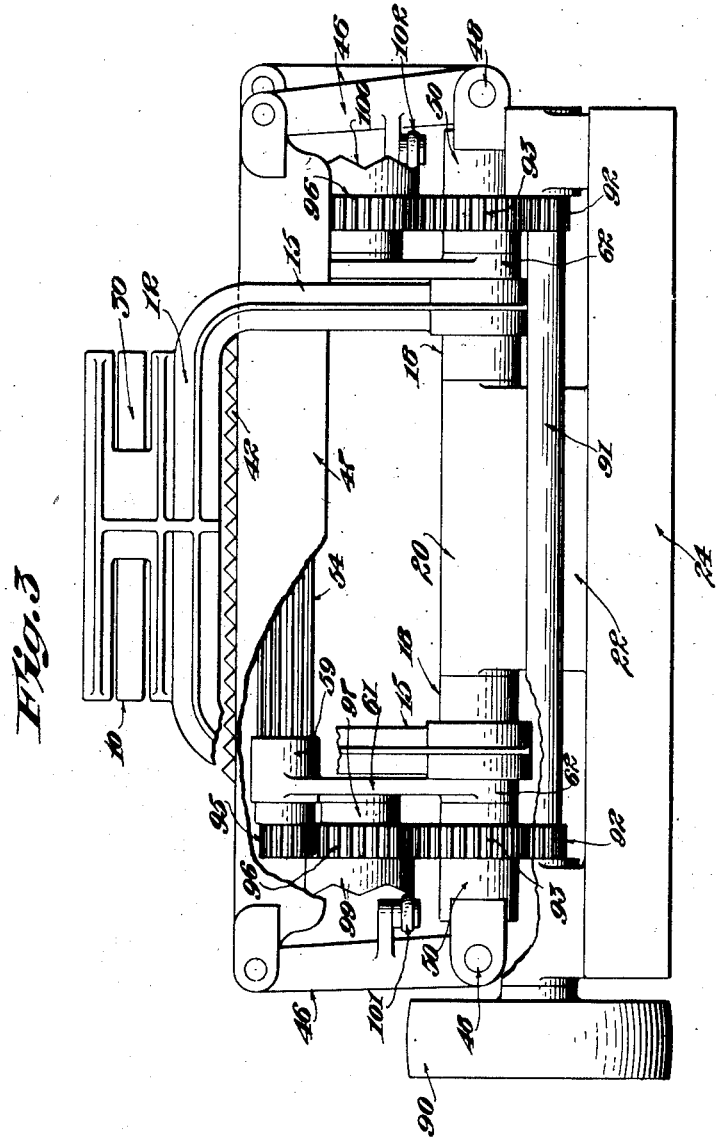
Inventors
Robert Reid
Andrew S. Reid
by J. Stanley Churchill
atty

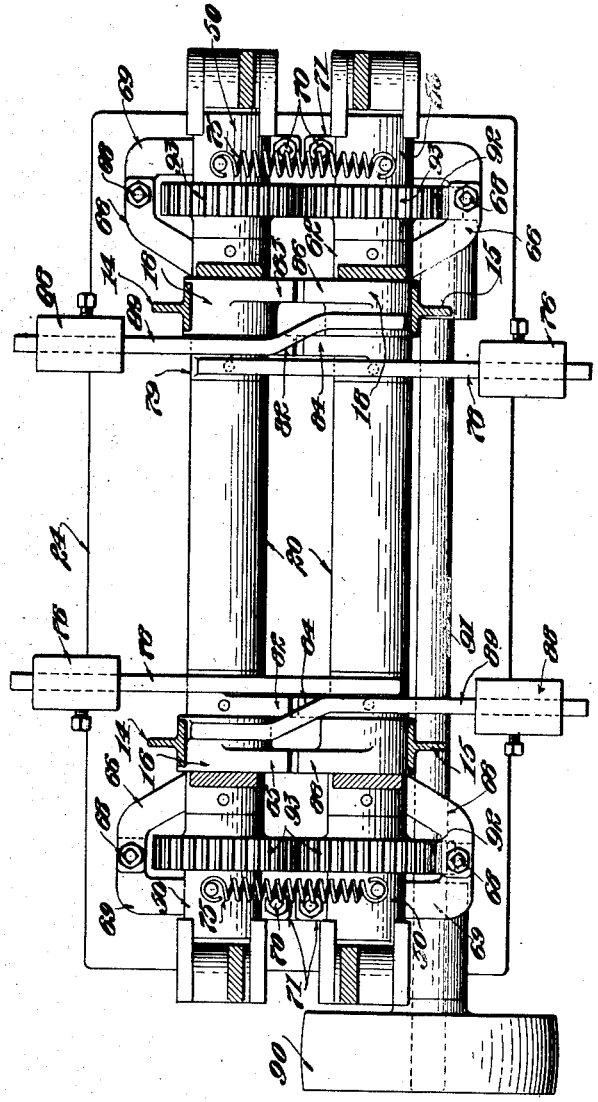

Patented Aug. 28, 1928.

1,682,418

UNITED STATES PATENT OFFICE.

ROBERT REID AND ANDREW S. REID, OF BEVERLY, MASSACHUSETTS.

CUTTING MACHINE.

Application filed August 31, 1927. Serial No. 216,712.

This invention relates to a cutting machine, and specifically to a fish cutting machine.

One object of the invention is to provide a cutting machine of novel construction, which is capable of automatically and economically cutting predetermined portions from successive articles fed thereto in a superior and practical manner, requiring a minimum amount of attention on the part of an operator.

A further object of the invention is to provide a novel and practical machine for efficiently and economically cutting fillets from successive fish fed thereto and in which provision is made for enabling the machine to efficiently and automatically adapt itself to fish of different size within predetermined limits as to thickness.

With these objects in view and such others as may hereinafter appear, the invention consists in the cutting machine and particularly in the fish handling and cutting machine, and in the structures, arrangements and combinations of parts hereinafter described and particularly defined in the claims at the end of this specification.

Figure 1:
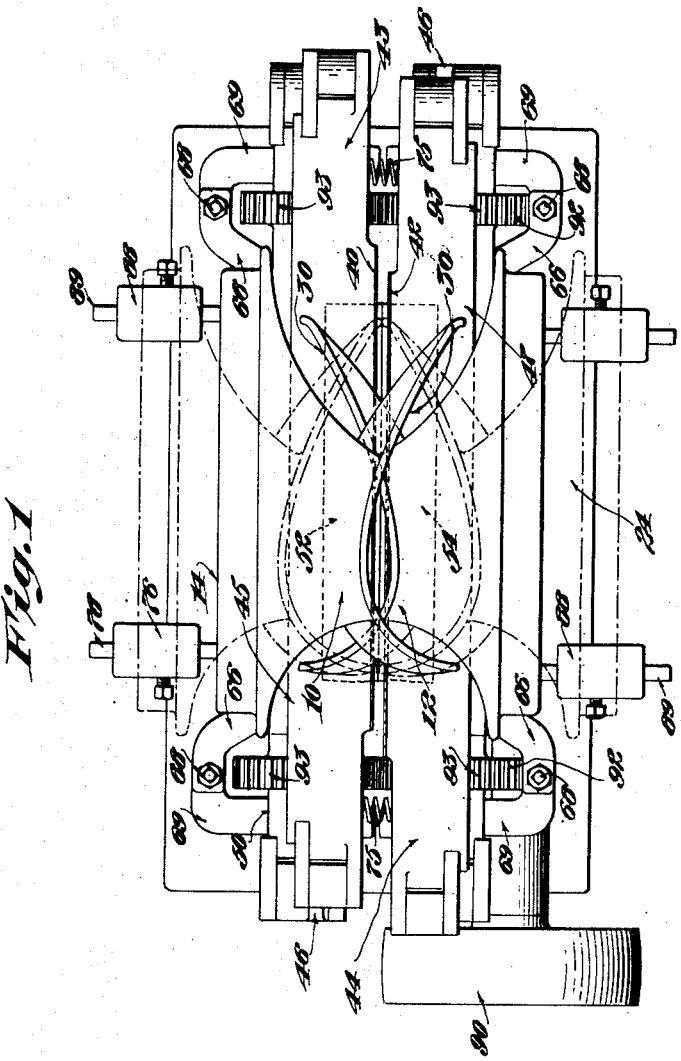
Figure 2:
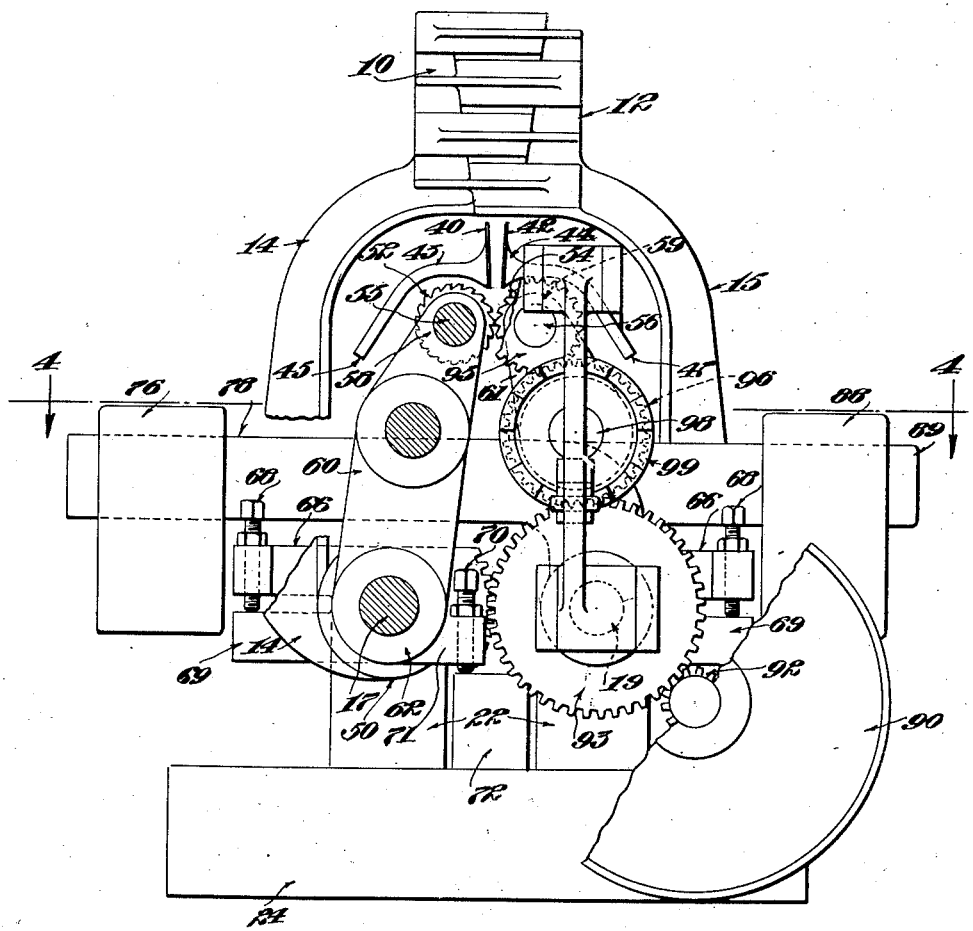
Figure 5:
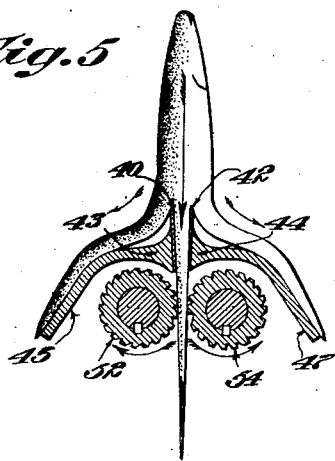

In the drawings illustrating the preferred embodiment of the invention, Figure 1 is a plan view of a machine embodying the features of the present invention, for cutting fillets from fish; Fig. 2 is an end elevation of the improved machine with portions thereof omitted for purposes of illustration; Fig. 3 is a side elevation with parts broken away of the machine illustrated in Figs. 1 and 2; Fig. 4 is a sectional view on the line 4—4 of Fig. 2; and Fig. 5 is a sectional detail illustrating the action of the knives and feed rolls in the operation of the machine.

In general, in a machine embodying the present invention, provision is made for automatically controlling the location of the cutting operation to automatically adapt the machine to cut articles of varying size, and in the preferred embodiment of the invention comprising a filleting machine, the location of the filleting cut in controlled to adapt the machine to operate economically on fish of varying size. In a practical machine the location of the cut is preferably controlled by the thickness of the backbone of the particular fish from which the fillets are being removed, thereby permitting the machine to operate upon fish of varying size and thickness, and insuring that the filleting cuts will be made as near the backbone as is practicable.

In the preferred and illustrated embodiment of the invention, the filleting machine comprises in general a pair of reciprocatory knives, cooperating members for drawing the fish past the knives, preferably tail first, and guide members for presenting the fish in a centralized and predetermined position with relation to the knives. Provision is preferably made for enabling the guide members to adjustably adapt themselves to fish of variable size and thickness while functioning to maintain the fish in a centralized position, and provision is also made for automatically adjusting the position of the knives laterally with relation to each other in order that the knives may automatically cut the proper portion of the fish of variable size. The feed members for drawing the fish past the knives are also preferably arranged to automatically adapt themselves to fish bones of varying thickness.

Referring now to the drawings, the successive fish are fed into the machine manually or otherwise, in a direction tail first, between cooperating guide members 10, 12, each mounted upon the upper end of a pair of guide arms 14, 15. The guide arms 14 are each provided with a hub 16 loosely mounted upon a rock shaft 17, and the guide arms 15 are provided with a similar hub 18 loosely mounted upon a rock shaft 19. The rock shafts 17 and 19 are spaced apart and journalled in suitable bearings 20 in standards 22 upstanding from the bottom base plate 24 of the machine. Each of the guide members 10 and 12 is provided with a plurality of bearing portions 30 which are spaced apart and offset one with relation to the other to permit the bearing portions upon one guide member 10 to dovetail into the spaces between adjacent bearing portions on the guide member 12 and to cooperate to form a tapered guide passage for the fish. The bearing portions themselves are each formed in a curve of such shape that in the different positions of the guide members, an opening between them is formed of the sectional shape of a fish. As the guide members are moved laterally outwardly this guide passage becomes of greater dimension while maintaining its shape corresponding to the sectional shape of a fish.

In the operation of the machine as above stated, successive fish are guided downwardly between the guide members in a direction tail first, and in the illustrated machine the tail of the fish is arranged to pass between a pair of spaced apart cutting knives 40, 42 comprising vertically arranged blades mounted upon knife supporting members 43, 44 extending transversely across the machine and pivoted at their opposite ends to the upper ends of levers 46 pivoted at 48 in a hub 50 on a driving gear mounted upon the ends of the rock shafts 17, 19, respectively, it being understood that each knife support is pivoted to be capable of transverse movement to perform the cutting operation and at the same time the construction is such that the knife and its supporting members are mounted upon the hubs 50 to be capable of being moved laterally of the machine in a direction toward and away from each other, as will be described. Provision is made in the machine for relatively moving the fish and the cutting knives in order to perform the cutting operation to remove the fillets from the fish, and as illustrated the machine is provided with a pair of corrugated feed rolls 52, 54 positioned beneath the cutting knives 40, 42 and arranged to engage the tail of the fish as the latter is guided downwardly between the cutting knives and to draw the fish downwardly to perform the cutting operation, the corrugated periphery of the rolls engaging the backbone of the fish, and in this manner feeding the fish downwardly in the manner illustrated diagrammatically in Fig. 5.

The cutting knives 40, 42 are preferably mounted upon knife supporting members 43, 44 of the shape illustrated in Figs. 1 and 5, each supporting member having an outwardly extended portion 45, 47 comprising guiding shields for guiding the fillets outwardly to permit them to be collected in suitable receptacles (not shown) while permitting the backbones of the fish to be drawn downwardly, as will be described, and collected in a different receptacle.

In the present machine illustrated in the drawings, the corrugated feed rolls 52, 54 are arranged to be capable of movement in a direction toward and away from each other, being shown as mounted upon shafts 55, 56 journalled in bearings 58, 59, in each of a pair of feed rolls carrying arms 60, 61, and the arms 60, 61 are provided with hubs 62 on the lower ends thereof mounted upon and pinned to the rock shafts 17, 19, respectively. With this construction it will be apparent that as successive fish are passed through the machine, the backbones of the larger fish being thicker will operate to spread apart the feed rolls 52, 54, and consequently through the arms 60, 61 to cause the rock shafts 17, 19 to be rocked.

Provision is preferably made for utilizing the outward movement of the arms 60, 61 to move the cutting knives 40, 42 outwardly and in a direction away from each other in order that the location of the cut may be controlled by the thickness of the backbone of the particular fish from which the fillets are being removed. As herein shown, the hubs 62 are provided with outwardly extending arms 66 each having a set screw 68 mounted therein, and the lower ends of the set screws 68 are adapted to cooperate with and engage arms 69 projecting outwardly from the hubs 50 above referred to, and which hubs 50 support the knife supporting members 43, 44, and the knives 40, 42, as above stated.

The knives 40, 42, mounted as above described upon the hubs 50, are yieldingly urged toward one another by coil springs 75, connecting opposed pairs of hubs 50, as illustrated in Fig. 4, and the inward movement of the hubs 50 and knives 40, 42 is limited by the engagement of stop screws 70 adjustably secured in arms 71 formed on the hubs 50, with a block 72 secured to the base plate 24 of the machine frame.

In order that the feed rolls 52, 54 and the knives 40, 42 may each move in unison, so as to maintain both the knives and the feed rolls spaced equidistant from the center line of the machine as they are moved outwardly by the passage through the feed rolls of a large backbone, the rock shafts 17, 19 are geared together, and as herein shown the hubs 79 are provided with segments 82, 84, respectively, which mesh and by which the hubs and consequently the rock shafts are geared together. The feed rolls 52, 54 are urged toward one another by counter weights 76 on levers 78 secured to the hubs 79, the latter being pinned to the rock shafts 17, 19, respectively. From the description thus far it will be observed that the set screws 68 and 70 may be adjusted to regulate not only the limit of movement of knives 40, 42 toward each other, but also to regulate the amount of outward movement of the feed rolls 52, 54 which may be desired, before the knives are started in their outward movement by the engagement of the arms 69 with the set screws 68, as will be seen from inspection of Figs. 2 and 4. In the operation of the machine when the backbone of the fish passes between the corrugated feed rolls 52, 54, the latter are each moved outwardly a distance of one-half of the thickness of the backbone, and as the arms 60, 61 are swung outwardly, the set screw 68 is brought into engagement with the arm 69 and causes the knives 40, 42 to be swung outwardly in the manner described.

Each of the guide members 10, 12 are arranged to be adjustably movable in a direction away from one another, and provision is made for insuring that the movement of each guide member 10 and 12 under the influence of the larger sizes of fish passing therethrough shall be in unison so as to maintain each guide member spaced equidistant from the center line of the machine and to thereby insure that the guide members function to present the fish in a centralized position with respect to the cutting knives 40, 42. As herein shown, each of the hubs 16, 18, (see Fig. 4) are provided with segments 85, 86, and the latter are arranged to mesh to gear the hubs and consequently the guide members together. The guide members are normally urged toward one another by counterweights 88 on levers 89 secured to one of the hubs 18, as illustrated in Fig. 4.

Provision is made for driving the feed rolls 52, 54, and for reciprocating the knives 40, 42 continuously during the operation of the machine, and as herein shown the machine is driven from a suitable source of power through a driving pulley 90 on the end of a driving shaft 91, through spur gears 92 on the opposite ends of the driving shaft, which are arranged to mesh with one set of gears 93 secured upon the hubs 50 rotatably mounted upon the rock shafts. The gears 93 upon the opposing hubs 50 are arranged to mesh with each other as illustrated in Fig. 4, and the set of gears 93 upon each rock shaft 17, 19, respectively, is arranged to drive gears 95 upon the shafts 55, 56, respectively, through idler gears 96 formed on hubs 97 mounted upon studs 98 carried by the arms 60, 61, respectively. Each knife 40, 42 is reciprocated by means of cams 99, 100 formed upon the outer surfaces of the idler gears 96, and with which cooperate cam rolls 101, 102, respectively, mounted upon the levers 46, as illustrated in Fig. 3.

It will therefore be observed that the present construction of drive for the feed rolls and for the knives enables both to be driven continuously during the operation of the machine and irrespective of the adjustment laterally of either the feed rolls or the knives.

From the description thus far it will be observed that in the present machine the location of the filleting cut is controlled by the thickness of the backbone of the fish, and in this manner it is possible to adjust the machine initially so that the cut is made as near as practicable to the backbone with any particular size of fish, and thereafter as the larger fish are passed through the machine the cutting knives 40, 42 are automatically moved outwardly a sufficient distance to insure that the filleting cut be made in the same relative position in the larger size fish. This feature of the invention contributes to the economical operation of the machine and minimizes the amount of fish meat left upon the backbone.

The present construction of fish filleting machine is relatively simple and durable, and lends itself to the use of the machine on board fishing vessels where the fish may be filleted as soon as caught and the fillets stored, thus saving considerable storage space and proportionately increasing the carrying capacity of the vessel, or to its use at the fish wharves where the filleting operation may be performed and the fillets shipped instead of the fish, thus saving freight and handling charges.

While the preferred embodiment of the invention has been illustrated and described, it will be understood that the invention may be embodied in other forms within the scope of the following claims.

Having thus described the invention what is claimed is:—

1. A fish filleting machine having, in combination, a cutting device, means for relatively moving a fish and the cutting device to perform the cutting operation, and means controlled by the thickness of the backbone of the fish for varying the location of the cut.

2. A fish filleting machine having, in combination, a cutting device, means for relatively moving a fish and the cutting device to perform the cutting operation, and means controlled by the thickness of the backbone of the fish for adjustably positioning the cutting device to thereby control the location of the cut.

3. A fish filleting machine having, in combination, a pair of cutting knives, feeding means adapted to cooperate with the backbone of the fish for drawing the bone between the knives to thereby cut a fillet from each side of the fish.

4. A fish filleting machine having, in combination, a pair of cutting knives, means adapted to cooperate with the backbone of the fish for drawing the bone between the knives to thereby cut a fillet from each side of the fish, and means for varying the location of the knives in accordance with the thickness of the backbone.

5. In a cutting machine, in combination, a cutting device and a pair of feed members for moving successive articles past the cutting device, said feed members being capable of automatically adjusting themselves to varying thicknesses of articles passing between them, and having provision for returning to a predetermined position after an article has passed between them.

6. In a cutting machine, in combination, a cutting device, a pair of feed members, means for supporting the feed members having provision for permitting them to be initially adjusted to a predetermined position, and means permitting the feed members to move away from each other to thereby adapt themselves to varying thicknesses of articles passing between them, and for automatically returning the feed members to their initial position, said means having provision whereby the feed members are maintained equidistant from a center line passing between them.

7. A fish filleting machine having, in combination, a cutting device, means for feeding a fish past the cutting device, and means controlled by variations in the thickness of the backbone of a fish for automatically moving the feeding means and the cutting device from a predetermined position, said means having provision for permitting the feeding means and cutting device to automatically return to a predetermined position after passage of a fish therethrough.

8. A fish filleting machine having, in combination, a pair of reciprocatory cutting knives, knife supporting means, and means for moving the knives toward and away from each other in accordance with variations in the thickness of the backbone of the particular fish passing therethrough.

9. A fish filleting machine having, in combination, a cutting device, means for relatively moving a fish and the cutting device to perform the cutting operation, and means responsive to the thickness of the fish for automatically varying the location of the cut.

10. A fish filleting machine having, in combination, a pair of cutting devices, means for relatively moving a fish and the cutting device to perform the cutting operation, and means responsive to the thickness of the fish for automatically moving the cutting devices away from each other to vary the location of the cut.

11. A fish filleting machine having, in combination, a pair of cutting devices, means for relatively moving a fish and the cutting device to perform the cutting operation, and means responsive to the thickness of the fish for automatically moving the cutting devices away from each other to vary the location of the cut, and for maintaining the devices equidistant from a center line in the different positions thereof.

12. In a fish filleting machine, in combination, guiding means, a cutting device, a feeding device, means responsive to variations in the thickness of the fish for varying the location of the cut, said guiding means having provision for automatic adjustment for fish of different size.

13. In a fish filleting machine, in combination, a pair of spaced apart cutting knives, cooperating feed members for drawing a fish tail first past the knives, and guiding means for presenting successive fish in a centralized and predetermined position with relation to the knives.

14. In a fish filleting machine, in combination, a pair of spaced apart cutting knives, cooperating feed members for drawing a fish tail first past the knives, and guiding means for presenting successive fish in a centralized and predetermined position with relation to the knives, said feed members, knives and guiding means being constructed and arranged to be capable of automatically adapting themselves to fish of varying size.

15. In a fish filleting machine, in combination, cutting means for performing the filleting operation, a feeding device, and means for guiding the fish to present it to the cutting means including a pair of relatively movable guide members provided with bearing surfaces formed of a shape such as to provide an opening between them of the sectional shape of a fish.

16. In a fish filleting machine, in combination, a pair of cutting knives, a pair of cooperating feed members for engaging the opposite sides of the backbone of the fish, and a pair of guide members for deflecting the fillets as they are cut.

17. In a fish filleting machine, in combination, a pair of cooperating cutting knives, shield members for guiding the fillets cut by the knives and cooperating feed rolls upon one side of the shield members for drawing the backbone of the fish therethrough.

18. In a fish filleting machine, in combination, a pair of cutting devices, a pair of cooperating feed members for engaging the nism for driving the feed members, said feed members being laterally movable, and the driving mechanism being supported to be capable of continuous operation while permitting adjustment of the feed members.

19. In a fish filleting machine, in combination, a pair of reciprocatory cutting knives, a pair of cooperating feed rolls, means for supporting the knives and feed rolls to permit lateral adjustment thereof, and driving mechanism for continuously driving the cutting knives and feed rolls while permitting the adjustment of both.

ROBERT REID.
ANDREW S. REID.

CERTIFICATE OF CORRECTION.

Patent No. 1,682,418.                          Granted August 28, 1928, to

ROBERT REID ET AL.

It is hereby certified that error appears in the printed specification of the above numbered patent requiring correction as follows: Page 4, line 88, claim 18, strike out the words "for engaging the" and insert instead the words and syllable "and driving mecha-"; and that the said Letters Patent should be read with this correction therein that the same may conform to the record of the case in the Patent Office.

Signed and sealed this 20th day of November, A. D. 1928.

(Seal)                                                          M. J. Moore,
                                                             Acting Commissioner of Patents.